March 10, 1936. H. SUMMA 2,033,556
WEAVING SHUTTLE
Filed May 15, 1933 7 Sheets-Sheet 1

H. Summa
INVENTOR

By: Marks & Clerk
Attys.

March 10, 1936.   H. SUMMA   2,033,556
WEAVING SHUTTLE
Filed May 15, 1933   7 Sheets-Sheet 2

H. Summa
INVENTOR
By Marks & Clerk
Attys.

March 10, 1936.    H. SUMMA    2,033,556
WEAVING SHUTTLE
Filed May 15, 1933    7 Sheets-Sheet 4

H. Summa
INVENTOR

By: Marks & Clerk
Attys.

Patented Mar. 10, 1936

2,033,556

UNITED STATES PATENT OFFICE 2,033,556

WEAVING SHUTTLE

Hans Summa, Schwarzenbach-on-the-Saale, Germany

Application May 15, 1933, Serial No. 671,215
In Germany March 10, 1933

7 Claims. (Cl. 139—223)

This invention relates to weaving shuttles which have a slot passing to the thread eye from the front upper part obliquely towards the rear. A slot, so directed, makes it possible to introduce the thread into the outer thread eye with the simplest of movements. All that is required, is to pull the thread, as is necessary in any case, for unwinding said thread off from the shuttle, first forwardly in the direction of the axis of the shuttle, and then in the opposite direction, deflecting the thread sideways at the same time. These movements are imparted to the thread in the course of the first two working strokes of an automatic shuttle exchange device, so that a shuttle having a slot located in the above described direction is particularly well suited for use in such an automatic shuttle exchange device.

One of the principal characteristics of the shuttle according to the present invention is, that its manufacture is exceedingly simple and therefore very economical because most of the parts which are concerned with the threading can be worked out of the wooden body of the shuttle and only one or two wires of a very simple shape are required.

According to the present invention the slot is so arranged in relation to the outer thread eye that two wedges are formed in the wooden body of the shuttle, the edges of said wedges being located in opposite direction to each other and located at a distance one from the other, the said wedges owing to their shape and their arrangement being particularly well suited for association with locking devices in the form of threader points.

As is known, the locking effect of the threader points is obtained because the said points cooperating with counter-supporting surfaces, bend the thread temporarily into a zig-zag shape.

The contours of the edges of the wedges are suitable for the above mentioned purpose, because only a small extension of these edges, by a short piece of wire having a very simple shape, is required to form a threader point. The counter-supporting surfaces are also formed out of the body of the shuttle, like the edges of the wedges and conveniently can be formed as grooves in the border at the foot of each co-operating wedge into which the wires protrude.

The position of the edges of the associated wedges is suitable for the arrangement of the threader points because the edge of one wedge is in such a position that the thread always comes within its region when it is drawn off the shuttle in the usual way, whilst the edge of the other wedge is in such a position that it secures the thread in its whole course in the shuttle, that is, from the bobbin to the place where it emerges from the outer thread eye.

It is advantageous so to arrange one of the associated edges that it is at the entrance and the other so that it is at the exit of the slot leading to the outer thread eye.

In arranging the surfaces of the wedges and the wires as guides for the thread during the threading operation, care must be taken that the changing from the one to the other takes place without impediment.

This is obtained by so arranging the wires that they conform with the side surfaces of the wedges and emerge at their edges. In this arrangement, each of the two edges must be concealed behind the wire and for this purpose, must lie between two limiting surfaces which are defined exactly for both edges hereinafter.

One limiting surface for the edge of one wedge is described by the thread when it slides along the wire which protrudes from this edge from the point of and below the shuttle, and the other limiting surface is described when the thread is pulled over the wire and over the oppositely arranged edge of the wooden part of the shuttle. Of the limiting surfaces of the other wedge, one is described when the thread slides along the wire from the inner thread eye above the shuttle, and the other when the thread slides along the wire from the inner thread eye below the shuttle.

It is a particular characteristic of the shuttle, according to the present invention, that it can be designed both as an automatic and as a hand shuttle, since the wedges provided in this improved shuttle, as well as their edges play a part in the threading in of the thread in either type of shuttle.

If the wire with the threader point is arranged on that edge of the wedge which is at the exit of the slot which leads to the outer thread eye, then, according to what has been stated above, the result is a hand shuttle having the advantage of absolutely reliable locking of the thread in the outer thread eye and consequently in the shuttle as a whole, and having the further incidental advantage that the tension of the thread is maintained exactly the same during the weaving process.

If the wedge which is at the entrance end of this slot is provided with the wire having the threader point, then, according to what has been stated above, the result will be a shuttle with an automatic threading device, which, if necessary, can also be used as a hand shuttle, if the locking of the thread in the outer thread eye is deemed unnecessary.

If the edges of both wedges are provided with wires, then the result will be a shuttle with a threader, which both in the case of threading by hand and when used in an automatic loom, offers the greatest security from unthreading and also guarantees an entirely even tension of the thread during the weaving process.

In making a shuttle according to the present invention it is possible to work out of the wooden body of the shuttle, not only the above mentioned parts, but also the inner thread eye. In this case the latter is formed by an enlarged circular bore at the bottom of the groove leading from the shuttle chamber to the threader, or leading out of the brake channel.

As illustrated, the shuttle is provided with a centrally disposed shuttle chamber 1 in which is arranged a bobbin (not shown in the drawings) from which the weft thread S proceeds. Connected with the shuttle chamber 1 is a channel 2, the inner sides of which are lined with plush 3 which acts as a brake, and from this channel 2 there is a groove 4 leading to the threader.

At the bottom of the groove 4 is an enlarged circular bore which forms the inner thread eye 5. From the thread eye the thread enters the threader, which will be described hereinafter, then passes into the outer thread eye 6 which is also of circular shape and is formed in the wooden body of the shuttle and finally leaves the shuttle. The inner thread eye is provided on one side, and the outer thread eye on both sides, with pins 7 and 8, which prevent the weft thread from coming into contact with, and cutting into, the wooden shuttle body.

A slot 9 leads towards the outer thread eye 6, said slot 9 being inclined from the front upper part towards the rear and in a downward direction. Through this slot the weft thread passes into the outer thread eye if it is pulled off in the direction of the shuttle axis and towards the front and deflected sideways in an opposite direction.

According to the present invention, this slot 9 is so arranged in relation to the outer thread eye 6 that two wedges 10 and 11 are formed in the wooden body of the shuttle, said wedges 10 and 11 having the edges 12 and 13 respectively, which face in opposite directions and which, whilst being parallel, are at some distance one from the other, the edge 12 of the wedge 10 is at the entrance of the slot 9 and the edge 13 of the wedge 11 is at the exit of the slot 9.

Figure 1:
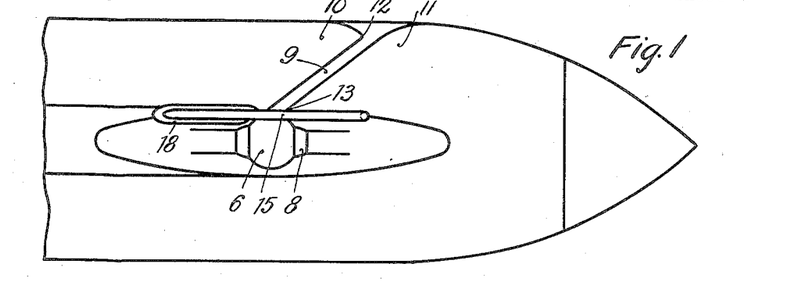
Figure 1 is an elevation of a shuttle according to this invention in which only the edge of the wedge at the exit of the slot arranged in relation to the outer thread eye is provided with a wire.
Figure 2:
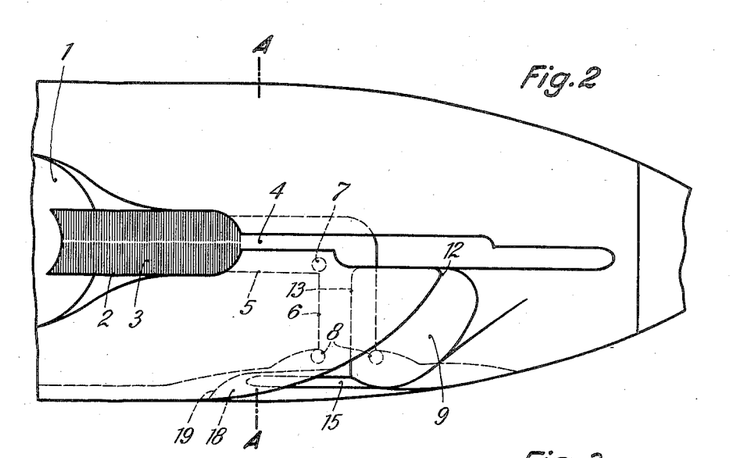
Figure 2 is a plan view of the shuttle illustrated in Figure 1.
Figure 3:
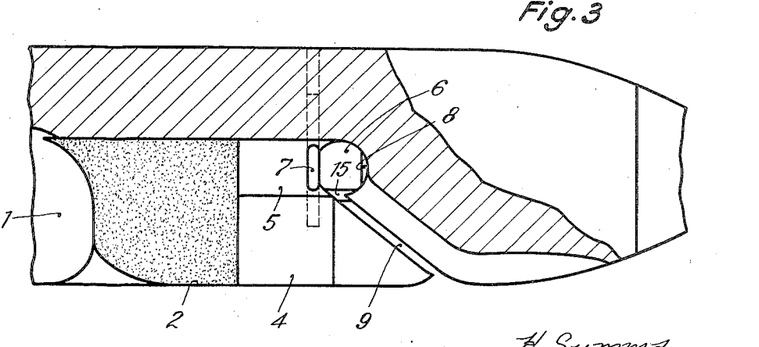
Figure 3 is a longitudinal section of the shuttle illustrated in Figures 1 and 2.
Figure 4:
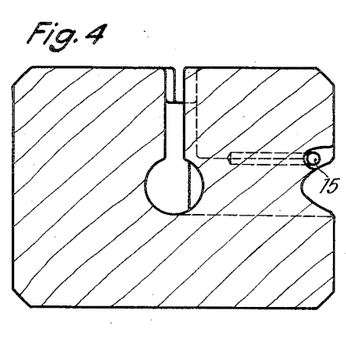
Figure 4 is a transverse section of Figure 2 taken on the line A—A of that figure.
Figure 5:
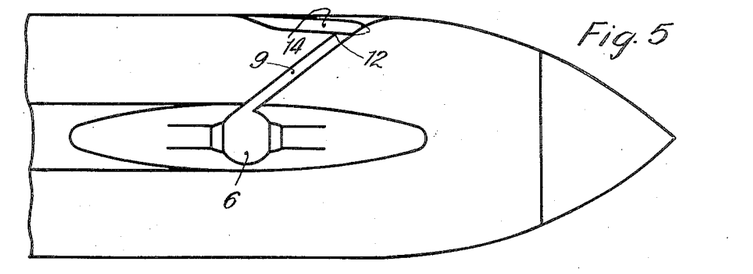
Figure 5 is an elevation of a shuttle according to this invention in which only the edge of the wedge at the entrance of the slot which leads to the outer thread eye is provided with a wire.
Figure 6:
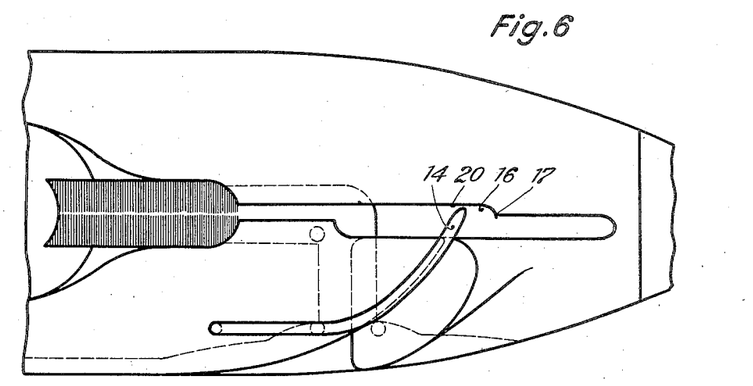
Figure 6 is a plan view of the shuttle illustrated in Figure 5.
Figure 7:
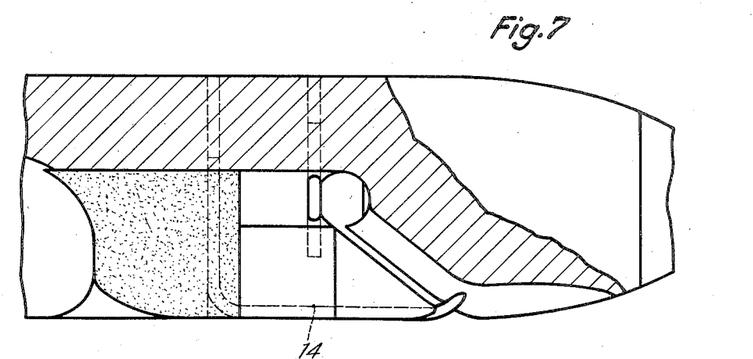
Figure 7 is a longitudinal section of the shuttle illustrated in Figures 5 and 6.
Figure 8:
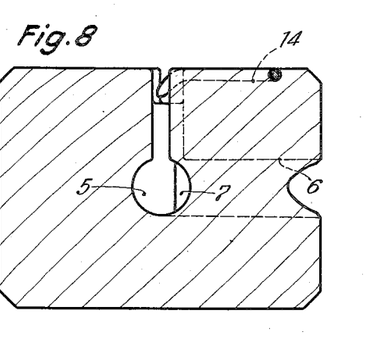
Figure 8 is a transverse section of Figure 6.
Figure 9:
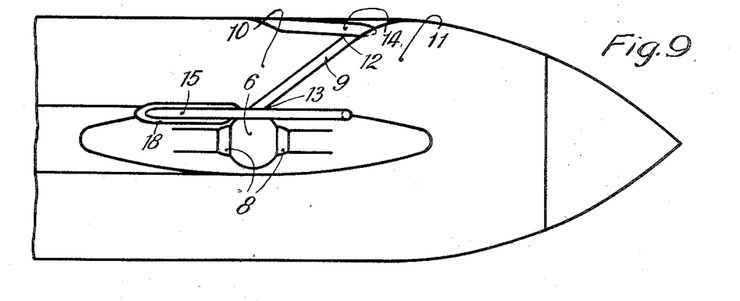
Figure 9 is an elevation of a shuttle according to this invention in which the edge of the wedge at the exit as well as the edge of the wedge at the entrance of the slot which leads to the outer thread eye is provided with a wire.
Figure 10:
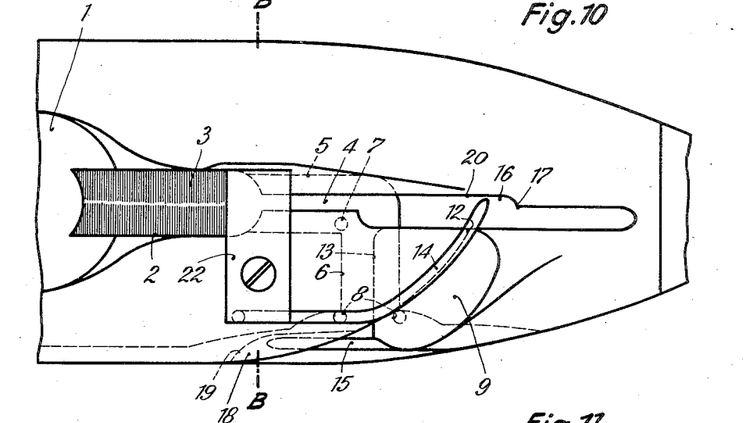
Figure 10 is a plan view of the shuttle illustrated in Figure 9.
Figure 11:
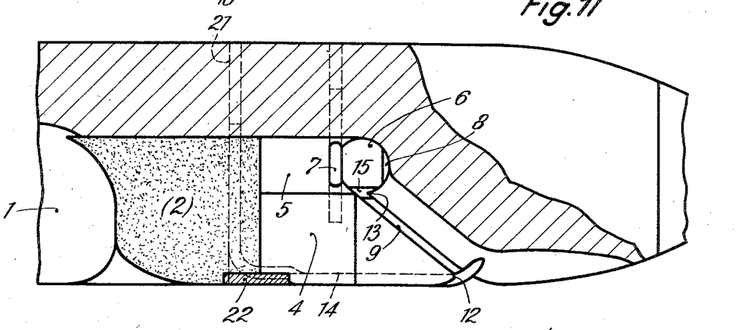
Figure 11 is a longitudinal section of the shuttle illustrated in Figures 9 and 10.
Figure 12:
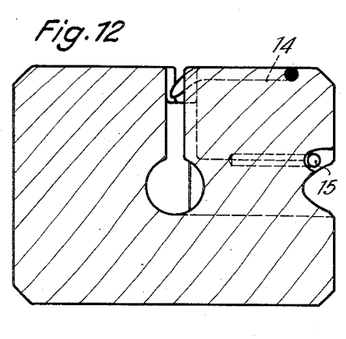
Figure 12 is a transverse section of Figure 6.

The contours of the edges 12 and 13 of the two wedges are seen with particular clearness in Figures 2, 6 and 10 and it will be observed that whilst the edge 13 has a considerable length, the edge 12 is shortened to a narrow point.

By this arrangement the wedges and their edges are particularly well suited to contribute to the successful threading of the weft thread. All that is required is to arrange on one of the two edges or on both of them, a short wire with a threader point in order to ensure the complete locking of the thread.

As illustrated in Figures 1 to 4, the edge 13, which is at the exit end of the slot 9, is provided with a wire 15; as illustrated in Figures 5 to 8, the edge 12 is provided with a wire 14; whilst as illustrated in Figures 9 to 12 the edges 12 and 13 both are provided with wires 14 and 15 respectively.

It is known that wires of this kind lock the thread, in that they, in conjunction with counter-supporting surfaces, bend the thread temporarily into a zig-zag shape. In the shuttle according to the present invention these counter-supporting surfaces are formed in the wooden body of the shuttle and form the edges of grooves into which the points of the wires 14 and 15 protrude. The wire 14 protrudes into the groove 16 having the counter-supporting surface 17, and the wire 15 protrudes into the groove 18 having the counter-supporting surface 19.

Care must be taken in the shaping of the wires and the wedges, so that the thread shall be able to pass from the wire to the wedge with the least resistance possible.

This is ensured by arranging the two wires 14 and 15 on their respective wedges 10 and 11 in such a way that, for part of their length, they conform with the side surfaces of the wedges and emerge at their edges and by so shaping the wooden wedges that their edges are concealed behind the wires and lie between two limiting surfaces.

Figure 13A:
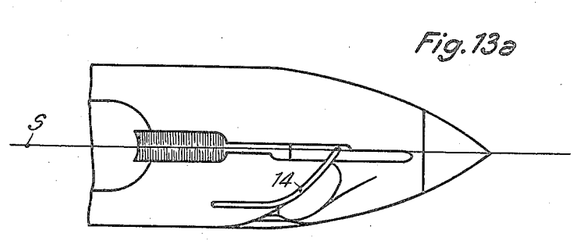
Figures 13a to 13h inclusive are plan views of a shuttle according to this invention in which both the edges of the wedge are provided with a wire and show the several consecutive positions occupied by the thread during the threading operation.
Figure 13B:
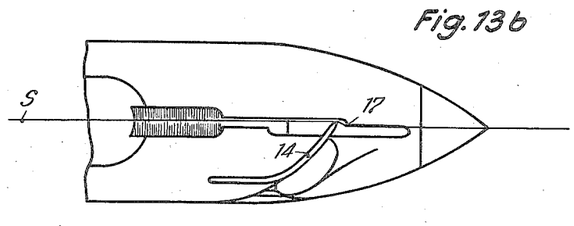
Figure 13C:
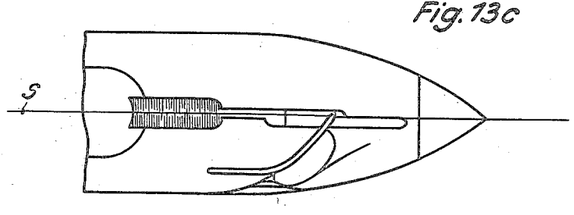
Figure 13D:
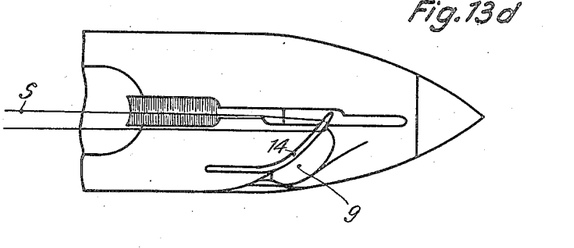
Figure 13E:
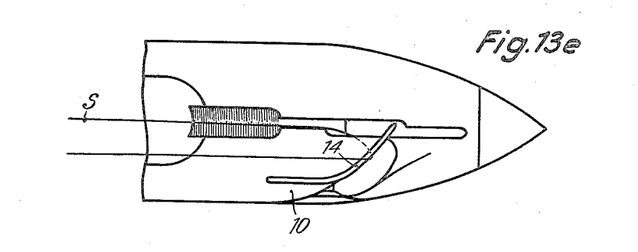
Figure 13F:
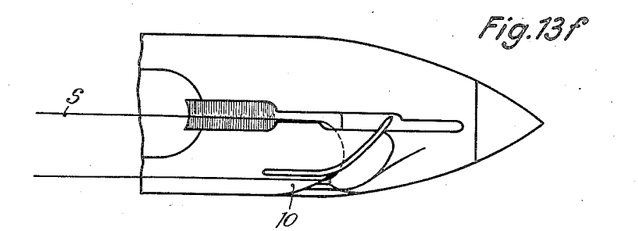
Figure 13G:
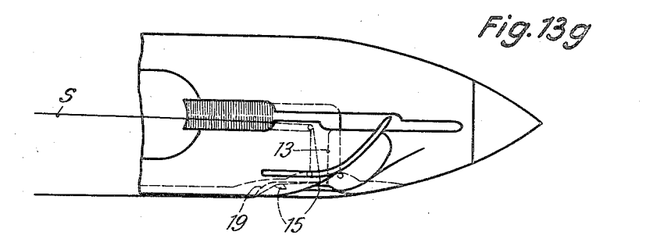
Figure 13H:
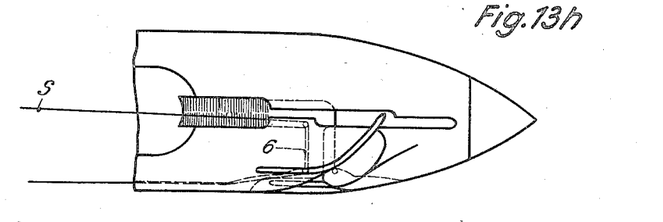
Figure 14A:
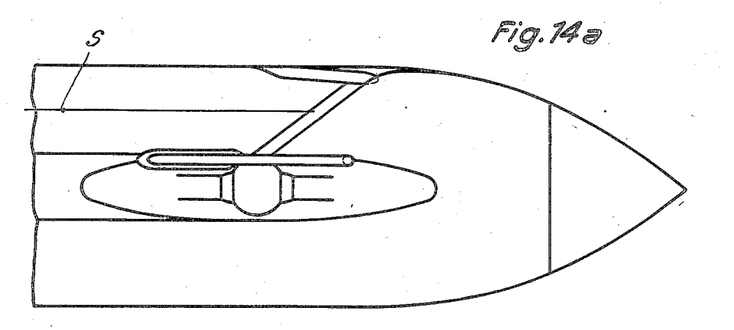
Figures 14a to 14c inclusive are elevations of the shuttle illustrated in Figures 13a to 13c and show the several consecutive positions occupied by the thread during the threading operation.
Figure 14B:
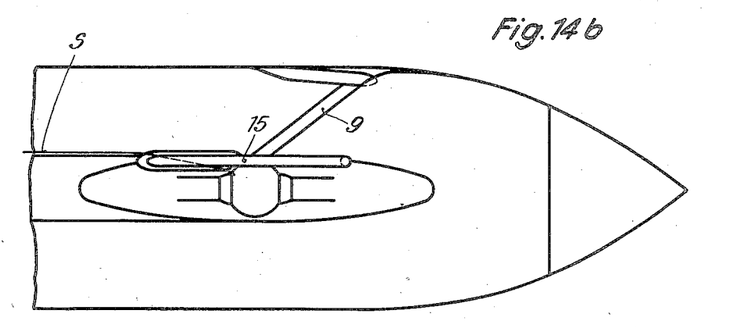
Figure 14C:
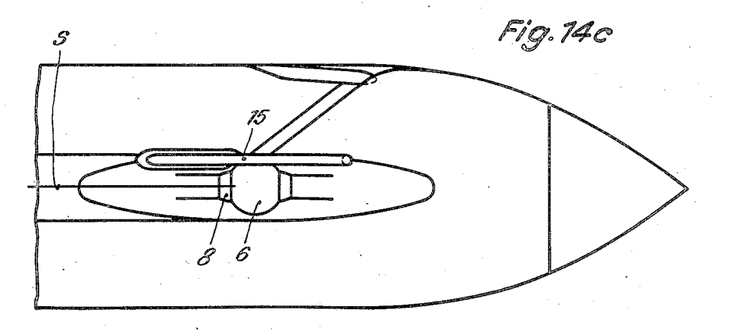

Figures 13 and 14 illustrate the process of automatic threading in its several phases in the case of a shuttle in which the edges 12 and 13 both are provided with wires 14 and 15, respectively.

At the first working stroke of the loom the weft thread S is pulled over the point of the shuttle (Figure 13a) and is guided to the point of the threader wire 14. For this purpose the latter is slightly inclined towards the point, as shown clearly in Figures 5 and 9. At this stage the weft thread is bent into zig-zag shape by the point of the threader wire 14 and the counter-supporting surface 17 which acts in conjunction with it and forms a locking bow for the thread (Figure 13b).

The thread then slips off the threader point and tightens so that it is disposed beneath the threader point and is thus prevented from unthreading (Figure 13c).

At the second working stroke, which now follows, the thread is guided round towards the rear end of the shuttle and thus forms a loop around the wire 14. During the further course of the threading process this loop slides along the wire 14 towards the rear (Figure 13d) and at the same time enters the slot 9, which leads obliquely downwards to the outer thread eye. The above described shape of the wire and the position of the wedge edge ensure that the loop of thread, in the further course of its movement, is guided by the wire 14 on to the wooden wedge 10 without rubbing on the wood. The thread is then guided for a time both by the wire 14 and the wooden wedge 10 (Figure 13e), a gradual loosening of the loop of thread taking place, until the loop is taken over by the wooden wedge (Figure 13f) without sudden impediment. The free end of the thread finally slides off the upper side of the shuttle and lies against its side as shown in Figure 14a.

In the course of the further downwards movement of the loop, the latter reaches the lower end of the slot 9 and rests on the wire 15 which emerges from the edge 13 which is at the exit end of the slot (Figures 13g and 14b). In this position the thread, in a way similar to that shown in Figure 13b, is bent in zig-zag shape by the counter-supporting surface 19, moves under the point of the wire 15, tightens in a way similar to that shown in Figure 13c and finally slides along the lower side of the wire 15 into the outer thread eye 6 (Figures 13h and 14c).

The thread is then completely entrapped by the wire 15, because it cannot move of its own accord in such a way that it can get in front of the point of the wire 15 and unthreading in any other way is impossible.

The elimination of one of the two wires 14 or 15 correspondingly simplifies the threading operation.

If the wire 14 is eliminated, as shown in Figures 1 to 4, then the thread is pulled by hand, instead of by the first working stroke of the loom, over the point of the shuttle and then is deflected sideways by hand, instead of by the second working stroke, in such a way that the thread forms a loop round the wooden wedge 10 and slides along with one of its ends in the slot 9. In other words, the thread will move directly from the position shown in Figure 13a into that shown in Figure 13f. After that, the operations proceed in the manner already described.

If the wire 15 is eliminated, as shown in Figures 5 to 8, then the process of threading will be exactly as illustrated in Figures 13a to 13f inclusive, with this difference, that the thread instead of lying against the wire 15 during its further downward movement and then sliding along it, will enter the outer thread eye 6 directly, as shown in Figures 13h and 14c.

In the first of these two latter cases therefore, a hand shuttle is described in which the thread is engaged in the outer thread eye in a simple and absolutely reliable way, it not being possible for the thread to slide upwards out of it, so that, for this reason it will have an unvarying tension during the weaving.

In the second case, an automatic shuttle of the simplest possible design is described, which can be used also as a hand shuttle if the locking in the outer thread eye seems unnecessary. The movements which are brought about by the two working strokes in the automatic shuttle must then, of course, be executed by hand.

If both the wires are used, then the shuttle can be employed either as a hand shuttle or as an automatic shuttle and offers the greatest guarantee against unthreading also.

The two wires 14 and 15 are anchored in the wooden body of the shuttle by their ends being bent over at a right angle and inserted into corresponding holes 21 bored in the wooden body of the shuttle. The hole 21 for the wire 14 can pass through to the lower side of the shuttle if desired so that a punch may be inserted in it for removing the wire.

Figure 15:
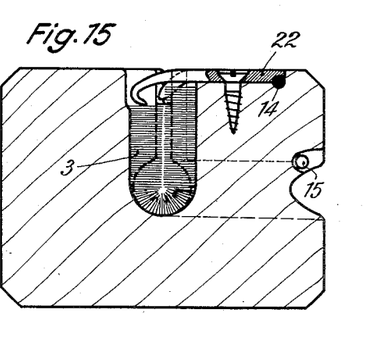
Figure 15 is a transverse section of Figure 10 taken on the line B—B of that figure and illustrates a modified form of the invention with a clamp.

As a further means of holding the wire 14 firmly in position, a clamp 22 as illustrated in Figure 15 can be used. This clamp is arranged sufficiently far towards the rear that it extends over the plush brake 3. It is bent downwards slightly at one end and the bevelled end rests against the upper edge of the plush pile. In this way the clamp produces a kind of weel or trap which the thread can pass without noticeable resistance if the thread is pulled towards the front. If, however, the thread should tend to move towards the rear, the plush pile at the entrance of the weel renders this impossible because the pile cannot follow this movement and acts as a brake, as it were.

I claim:—

1. Weaving shuttle having in combination, a body part, a chamber in said body part for a weft thread bobbin, an inner thread eye, an outer thread eye, a plush lined channel constituting a thread brake, two juxtaposed wedges formed in said body part, oppositely disposed spaced oblique edges on said wedges, a threader wire on one wedge, edges co-operating with the point of said threader wire to bend the weft thread temporarily into zig-zag shape, a clamp for said wire, and a bevelled end on said clamp for deflecting the pile of the plush.

2. A weaving shuttle including a body, inner and outer thread eyes thereon, said body being provided with a slot extending obliquely from the front upper part downwardly towards the rear and towards the outer thread eye to provide opposed wedges, a counter supporting surface provided on the body adjacent one edge of one of the wedges, a wire carried by the body adjacent the same edge of the wedge and cooperating with the counter-supporting surface to bend and guide the thread so that the latter is automatically moved to a position beneath the wire and the wire being so positioned relatively to the counter-supporting surface as to prevent accidental disengagement of the thread, said wire acting to guide the thread as the latter is moved along the edge of the wedge and said wire in addition protruding over and extending along said edge for concealing the said edge.

3. A weaving shuttle as claimed in claim 2 wherein the counter supporting surface is in the form of a groove situated at the base of the corresponding wedge and into which groove the wire with its threader point extends.

4. Weaving shuttle as claimed in claim 2 wherein two counter supporting surfaces are provided on the body adjacent both edges of the wedges and wherein two wires are provided for cooperating therewith.

5. Weaving shuttle as claimed in claim 2 wherein two counter supporting surfaces are provided on the body adjacent both edges of the wedges and wherein two wires are provided for cooperating therewith, one of the two wires crossing the slot leading to the outer thread eye directly over this thread eye.

6. A weaving shuttle as claimed in claim 2 wherein a shuttle chamber is provided in the body, said body also having a groove, a channel leading from the chamber to the groove, said groove leading to the threader and the inner thread eye being in the form of an enlarged bore at the bottom of the groove.

7. Weaving shuttle as claimed in claim 2 comprising a clamp for securing the wire protruding from a wedge edge and a plush brake over which extends the bent over end of the clamp and thus forms therewith a kind of weel for the thread.

HANS SUMMA.